United States Patent [19]

Imashiro et al.

[11] Patent Number: 5,856,014
[45] Date of Patent: Jan. 5, 1999

[54] AQUEOUS COATING COMPOSITION FOR THE MANUFACTURE OF PRECOATED METAL

[75] Inventors: Yasuo Imashiro; Ikuo Takahashi; Naofumi Horie; Takeshi Yamane, all of Tokyo, Japan

[73] Assignee: Nisshinbo Industries, Inc., Tokyo, Japan

[21] Appl. No.: 808,499

[22] Filed: Feb. 27, 1997

[30] Foreign Application Priority Data

Feb. 29, 1996 [JP] Japan .................................. 8-069032

[51] Int. Cl.$^6$ ...................................................... C08K 5/29
[52] U.S. Cl. ...................... 428/425.8; 428/458; 428/463; 524/195
[58] Field of Search .......................... 524/195; 428/425.8, 428/458, 463

[56] References Cited

U.S. PATENT DOCUMENTS

| | | | |
|---|---|---|---|
| 2,941,956 | 8/1960 | Bergstrom | 252/418 |
| 4,048,128 | 9/1977 | Eastman | 524/100 |
| 4,111,926 | 9/1978 | Sera | 524/100 |
| 4,113,676 | 9/1978 | Niederst | 524/195 |
| 4,206,076 | 6/1980 | Hofer | 524/100 |
| 4,977,219 | 12/1990 | Watson, Jr. | 525/329.5 |
| 5,081,173 | 1/1992 | Taylor | 524/195 |
| 5,117,059 | 5/1992 | Tylor | 564/252 |
| 5,258,481 | 11/1993 | Hesselmans et al. | 528/28 |

FOREIGN PATENT DOCUMENTS

| | | |
|---|---|---|
| 241805 | 10/1987 | European Pat. Off. . |
| 368375 | 5/1990 | European Pat. Off. . |
| 410557 | 9/1995 | Germany . |
| 733279 | 8/1972 | Japan . |

*Primary Examiner*—Paul R. Michl
*Attorney, Agent, or Firm*—Birch, Stewart, Kolasch & Birch, LLP

[57] ABSTRACT

An aqueous coating composition for the manufacture of precoated metal is based on an aqueous resin having a carboxyl group in a molecule and neutralizable with a basic material as a binder, the aqueous resin being selected from an acrylic copolymer resin, polyester resin, and polyurethane resin. A mono- or poly-carbodiimide compound is blended with the aqueous resin. The composition forms a coating having improved chemical resistance, water resistance, and adhesion to sheet metal.

4 Claims, No Drawings

AQUEOUS COATING COMPOSITION FOR THE MANUFACTURE OF PRECOATED METAL

BACKGROUND OF THE INVENTION

1. Field of the Invention

This invention relates to an aqueous coating composition for use in the manufacture of precoated sheet metal and more particularly, to an aqueous coating composition for the manufacture of precoated metal sheets which forms a coating having improved adhesion, chemical resistance and water resistance so that the precoated metal sheets are useful as exterior members of electric appliances and buildings.

2. Prior Art

The precoated metal technology is to previously coat metal sheets such as iron sheets, aluminum sheets, galvanized sheets, and stainless steel sheets with paint before the metal sheets are mechanically worked into complex shapes as by die pressing, bending, embossing, rolling, and drawing. This technology has been widely employed for decades because surfaces of complex shape can have a uniform coating of paint.

In the precoated metal technology, coating is followed by working and assembling steps. Coating compositions used in the precoated metal technology are required to tolerate impacts encountered upon shaping as by bending, rolling and embossing and possess firm adhesion to and coverage on sheet metal. They are sometimes required to be resistant to mar and stain. For outdoor use, they are required to be weather resistant.

Prior art metal precoating compositions are based on aminoalkyd resins, aminoacrylic resins, and epoxy resins. Recently used are polyurethane resins from which precoated metal featuring improved working is obtained. Most metal precoating compositions are of the solvent type using organic solvents such as toluene, xylene, methyl ethyl ketone, methyl isobutyl ketone, ethyl acetate, butyl acetate, cyclohexanone, and cyclohexanol. There is an increasing demand for aqueous coating compositions.

Aqueous coating compositions which have been commonly used contain acrylic copolymer resins, polyester resins and polyurethane resins each having a carboxyl group as a binder. These aqueous coating compositions, however, are less suitable for the manufacture of precoated metal. After the composition is applied and dried to a metal sheet, the coated metal sheet is mechanically shaped whereupon the coating can be peeled from the underlying metal sheet. Upon exposure to solvent or hot water, the coating can be dissolved. These undesirable phenomena are caused by the hydrophilic nature of a carboxyl group in the binder resin in the aqueous coating composition. The problems can be overcome to some extent by selecting an aqueous resin having a low acid value to reduce hydrophilic nature. The aqueous resin having a low acid value, however, is less soluble or dispersible in water and in an extreme event, does not satisfy the requirements as paint of pigment dispersion, an appropriate viscosity and transition. It is then quite difficult to provide a practically acceptable coating composition. There is a need to have an aqueous metal precoating composition free from the above-mentioned problems.

SUMMARY OF THE INVENTION

An object of the present invention is to provide a novel and improved aqueous metal precoating composition which forms a coating featuring adhesion, chemical resistance, and water resistance.

The invention pertains to an aqueous coating composition for the manufacture of precoated metal comprising an aqueous resin having a carboxyl group in a molecule and neutralizable with a basic material as a binder. The aqueous resin is selected from the group consisting of an acrylic copolymer resin, polyester resin, and polyurethane resin. We have found that the above-mentioned problems of such an aqueous coating composition can be overcome by blending a mono- and/or poly-carbodiimide compound therein. There is obtained a practically acceptable aqueous coating composition capable of forming a coating having improved properties including adhesion, chemical resistance, stain resistance and water resistance.

According to the present invention, there is provided an aqueous coating composition for the manufacture of precoated metal comprising an aqueous resin having a carboxyl group in a molecule and neutralizable with a basic material as a binder, the aqueous resin being selected from the group consisting of an acrylic copolymer resin, polyester resin, and polyurethane resin, and a mono- and/or poly-carbodiimide compound.

DESCRIPTION OF THE PREFERRED EMBODIMENTS

The present invention is directed to an aqueous metal precoating composition comprising an aqueous resin having a carboxyl group in a molecule and neutralizable with a basic material as a binder.

The aqueous resin used as a binder is selected from the group consisting of an acrylic copolymer resin, polyester resin, and polyurethane resin, each having a carboxyl group in a molecule and neutralizable with a basic material. Also useful is a modified resin obtained by modifying any of these resins by a grafting method or the like. These aqueous resins may be used alone or in admixture of two or more.

In one preferred embodiment, the aqueous resin has an acid value based on carboxyl group in the range of 20 to 200 KOH mg/g, especially 40 to 150 KOH mg/g. An aqueous resin with an acid value of less than 20 KOH mg/g would gradually lose solubility when a carbodiimide compound is blended therewith, so that the coating composition during application or left after application might thicken, gel or allow the pigment to separate. With an acid value of more than 200 KOH mg/g, there is a likelihood that a hydrophilic group remain in a dry coating, which is insufficient in water resistance. Such a higher acid value additionally requires to blend a more amount of carbodiimide compound at the sacrifice of economy.

Included in the acrylic copolymer resin having a carboxyl group are acrylic resins obtained by copolymerizing a polymerizable unsaturated carboxylic acid such as acrylic acid, itaconic acid, maleic acid, fumaric acid, and chrotonic acid or an anhydride thereof with an acrylic ester such as methyl acrylate, ethyl acrylate, butyl acrylate, 2ethylhexyl acrylate, and 2-hydroxyethyl acrylate or an acrylic monomer other than acrylic acid such as acrylamide and acrylonitrile, and optionally α-methylstyrene, vinyl acetate or the like by conventional polymerization techniques such as emulsion polymerization, solution polymerization, and mass polymerization.

Exemplary of the polyester resin having a carboxyl group are polyester resins obtained by effecting selective monoesterification reaction between glycol or polyester glycol terminated with a hydroxyl group and tetracarboxylic acid dianhydride to thereby extend the chain.

Exemplary of the polyurethane resin having a carboxyl group are polyurethane resins obtained by reacting an isocyanate compound, a polyol and/or amino acid containing a carboxyl group, and polyol to form a carboxyl group-containing urethane prepolymer, reacting the urethane prepolymer with a basic organic compound and a chain extender in the presence of a solvent or water, and removing the solvent in vacuum.

According to the invention, a carbodiimide compound having at least one carbodiimide group in a molecule (that is, mono- or poly-carbodiimide compound) is blended with the above-mentioned aqueous resin to form an aqueous coating composition.

Examples of the monocarbodiimide compound include dicyclohexylcarbodiimide, diisopropylcarbodiimide, dimethyl-carbodiimide, diisobutylcarbodiimide, dioctylcarbodiimide, t-butylisopropylcarbodiimide, diphenylcarbodiimide, di-t-butylcarbodiimide, and di-β-naphthylcarbodiimide. Among these, dicyclohexylcarbodiimide and diisopropylcarbodiimide are preferred for ease of commercial availability.

There may be used any of polycarbodiimide compounds prepared by various methods. Most often, a choice is made among polycarbodiimide compounds which are prepared by typical conventional methods as disclosed in U.S. Pat. No. 2,941,956, JP-B 33279/1972, J. Org. Chem., 28, 2069–2075 (1963), and Chemical Review 1981, Vol. 81, No. 4, pp. 619–621. More particularly, organic diisocyanates are subject to condensation reaction with concomitant decarboxylation to synthesize isocyanate-terminated polycarbodiimides.

The organic diisocyanates used as a raw material for the synthesis of polycarbodiimide compounds include aromatic diisocyanates, aliphatic diisocyanates, alicyclic diisocyanates, and mixtures thereof, for example, 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, mixtures of 2,4tolylene diisocyanate and 2,6-tolylene diisocyanate, hexamethylene diisocyanate, cyclohexane-1,4-diisocyanate, xylylene diisocyanate, isophorone diisocyanate, dicyclo-hexylmethane-4,4-diisocyanate, methylcyclohexane diisocyanate, and tetramethylxylylene diisocyanate.

During reaction of the organic diisocyanate, the molecule being formed may be controlled to an appropriate degree of polymerization using a compound capable of reacting with a terminal isocyanate, such as a monoisocyanate. Examples of the monoisocyanate used to block the end of polycarbodiimide to control its degree of polymerization include phenyl isocyanate, tolyl isocyanate, dimethylphenyl isocyanate, cyclohexyl isocyanate, butyl isocyanate, and naphthyl isocyanate. Other useful end-blocking agents are compounds having a terminal —OH, —NH, —COOH, —SH and —NH alkyl group.

Condensation reaction with concomitant decarboxylation of the organic diisocyanates takes place in the presence of carbodiimidizing catalysts. Exemplary catalysts are phospholene oxides such as 1-phenyl-2-phospholene-1-oxide, 3-methyl-2-phospholene-1-oxide, 1-ethyl-2-phospholene-1-oxide, and 3-methyl-1-phenyl-2-phospholene-1-oxide, and 3-phospholene isomers thereof. Among these, 3-methyl-1-phenyl-2-phospholene-1-oxide is preferred from the standpoint of reactivity. The catalyst may be used in a catalytic amount.

It is desired that the mono- or poly-carbodiimide compound be maintained in a uniformly dispersed state when it is blended in an aqueous coating composition. Then in one preferred embodiment, the carbodiimide compound is blended in the form of an emulsion obtained by emulsifying the compound with the aid of an emulsifier. In another preferred embodiment, the carbodiimide compound is converted into a self-emulsifying or self-solubilizing form by adding a hydrophilic segment to its molecular structure before it is blended in the coating composition.

The emulsifier which helps the carbodiimide compound be emulsified into an emulsion is preferably selected from nonionic surfactants, typically nonylphenyl surfactants.

The self-emulsifying or self-solubilizing form of carbodiimide compound can be prepared by effecting condensation reaction with concomitant decarboxylation of an organic diisocyanate to synthesize an isocyanate-terminated polycarbodiimide and thereafter, adding thereto a hydrophilic segment having a functional group reactive with an isocyanate group.

The hydrophilic segment is exemplified by compounds of the following formulae (1) to (4).

Useful are quaternary ammonium salts of dialkylaminoalcohols represented by the formula:

$(R^1)_2—N—R^2—OH$         (1)

wherein $R^1$ is a lower alkyl group and $R^2$ is an alkylene, polyalkylene or oxyalkylene group having 1 to 10 carbon atoms. A quaternary salt of 2-dimethylaminoethanol is especially useful. In this case, the polycarbodiimide becomes of cationic type.

Also useful are quaternary ammonium salts of dialkylaminoalkylamines represented by the formula:

$(R^1)_2—N—R^2—NH_2$         (2)

wherein $R^1$ and $R^2$ are as defined above. A quaternary salt of 3-dimethylamino-n-propylamine is especially useful. In this case, the polycarbodiimide becomes of cationic type.

Further employable are alkylsulfonic acid salts having at least one reactive hydroxyl group represented by the formula:

$HO—R^3—SO_3R^4$         (3)

wherein $R^3$ is an alkylene group having 1 to 10 carbon atoms and $R^4$ is an alkali metal. Sodium hydroxypropanesulfonate is especially useful. In this case, the polycarbodiimide becomes of anionic type.

Further employable are poly(ethylene oxide) end-blocked with an alkoxy group or a mixture of poly(ethylene oxide) and poly(propylene oxide) represented by the formula:

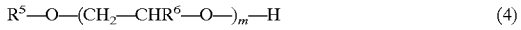

$R^5—O—(CH_2—CHR^6—O—)_m—H$         (4)

wherein $R^5$ is an alkyl group having 1 to 4 carbon atoms, $R^6$ is a hydrogen atom or methyl group, and m is an integer of 4 to 30. A poly(ethylene oxide) end-blocked with a methoxy or ethoxy group is especially useful. In this case, the polycarbodiimide becomes of nonionic type.

Preferably the carbodiimide compound is blended in a coating composition in such an amount that the molar ratio of carbodiimide group in the carbodiimide compound to carboxyl group in the aqueous resin may range from 0.2/1 to 20/1, especially from 0.4/1 to 10/1. With a carbodiimide group/carboxyl group molar ratio of less than 0.2, the hydrophilic carboxyl group would be left in a dry coating which might fail to be resistant to water. A carbodiimide group/carboxyl group molar ratio of more than 20 would result in a coating which is too hard to mechanically shape.

In addition to the above-mentioned components, an optional component or components may be added to the coating composition of the invention. Such optional components include pigments added for color hiding effect, fillers, curing catalysts, coating surface regulating agents, surfactants, dispersants, plasticizers, UV absorbers, and antioxidants. Exemplary pigments are titanium white, cyanine blue, chrome yellow, Watchung Red, red iron oxide, carbon black, and aniline black. These optional components are added in conventional amounts insofar as the benefits of the invention are not lost.

The coating composition of the invention is prepared by mixing the essential and optional components in a mixer such as a roll mill, ball mill and pressure kneader. It is recommended to use water as a diluent. The appropriate viscosity of a coating composition largely varies with an application method, applicator type, application speed, coating thickness, and surface state. Accordingly, the amount of water used as a diluent is properly determined by taking these factors into account. It is preferred that most of the diluent be volatilized off from a coating by an evaporating step or forced heat drying step taken prior to curing of the coating. If a substantial fraction of the diluent is left in the coating, it can adversely affect the hardness, adhesion upon working, water resistance, and chemical resistance of the coating.

Any desired method may be used to apply the coating composition to form a thin film. For example, spray coating, roller coating, roll coating, curtain flow coating, casting and knife edge coating may be employed. For facilitated application, the coating composition may be applied at elevated temperature or under pressure.

After a coating composition is applied, the coating is optionally dried and cured or baked. Heat curing is to raise the temperature of the coating to accelerate cross-linking reaction. Use may be made of various heating means such as an electric heating oven, hot air heating oven, infrared heating oven, and high-frequency heating oven. For baking, a baking temperature and time are properly selected in consideration of the formulation of a coating composition, the size and gage of sheet metal, the capacity of a baking oven, and other factors.

There has been described an aqueous coating composition comprising an aqueous resin and a carbodiimide compound which forms on sheet metal a coating having improved properties including adhesion, chemical resistance, and water resistance. Because of aqueous nature, the coating composition is desirable from environmental and hygienic aspects. The precoated metal sheets are useful as metal members of electric appliances such as refrigerators, clothes washers, and vending machines and exterior metal members for buildings such as precoated galvanized sheets.

EXAMPLE

Examples of the present invention are given below by way of illustration and not by way of limitation. All parts are by weight.

Synthesis Example 1

Aqueous carbodiimide 1 (forced dispersion of aliphatic carbodiimide)

Reaction between 549 grams of m-tetramethylxylylene diisocyanate and 49.5 grams of n-butyl isocyanate was effected in the presence of 5.99 grams of a carbodiimidizing catalyst (3-methyl-1-phenyl-2-phospholene-1-oxide) at 180° C. for 24 hours, yielding m-tetramethylxylylene carbodiimide having a degree of polymerization of 10. To 200 grams of this carbodiimide, 200 grams of distilled water having 1 gram of a nonylphenyl nonionic surfactant (Nonypol by Sanyo Chemicals K.K.) dissolved therein was slowly added, obtaining a carbodiimide dispersion (resin concentration 50% by weight).

Synthesis Example 2

Aqueous carbodiimide 2 (forced dispersion of aliphatic carbodiimide)

Reaction between 590 grams of 4,4-dicyclohexylmethane diisocyanate and 62.6 grams of cyclohexyl isocyanate was effected in the presence of 6.12 grams of a carbodiimidizing catalyst (3-methyl-1-phenyl-2-phospholene-1-oxide) at 180° C. for 24 hours, yielding 4,4-dicyclohexylmethane carbodiimide having a degree of polymerization of 10. The carbodiimide resin was thoroughly pulverized. To 200 grams of this carbodiimide, 200 grams of distilled water having 1 gram of a nonylphenyl nonionic surfactant (Nonypol) dissolved therein was slowly added, obtaining a carbodiimide dispersion (resin concentration 50% by weight).

Synthesis Example 3

Aqueous carbodiimide 3 (forced dispersion of aliphatic carbodiimide)

Reaction between 500 grams of isophorone diisocyanate and 62.6 grams of cyclohexyl isocyanate was effected in the presence of 5.63 grams of a carbodiimidizing catalyst (3methyl-1-phenyl-2-phospholene-1-oxide) at 180° C. for 24 hours, yielding isophorone carbodiimide having a degree of polymerization of 10. The carbodiimide resin was thoroughly pulverized. To 200 grams of this carbodiimide, 200 grams of distilled water having 1 gram of a nonylphenyl nonionic surfactant (Nonypol) dissolved therein was slowly added, obtaining a carbodiimide dispersion (resin concentration 50% by weight).

Synthesis Example 4

Aqueous carbodiimide 4 (forced dispersion of aromatic carbodiimide)

Reaction between 563 grams of 4,4-diphenylmethane diisocyanate and 59.5 grams of phenyl isocyanate was effected in 2458 grams of Perclene® in the presence of 1.50 grams of a carbodiimidizing catalyst (3-methyl-1-phenyl-2-phospholene-1-oxide) at 120° C. for 4 hours, yielding a solution of carbodiimide having a degree of polymerization of 10. The carbodiimide solution was cooled into a slurry and spray dried, obtaining carbodiimide powder. To 200 grams of this carbodiimide powder, 200 grams of distilled water having 1 gram of a nonylphenyl nonionic surfactant (Nonypol) dissolved therein was slowly added, obtaining a carbodiimide dispersion (resin concentration 50% by weight).

Synthesis Example 5

Aqueous carbodiimide 5 (forced dispersion of aromatic carbodiimide)

Reaction between 348 grams of a mixture of 2,6-tolylene diisocyanate and 2,4-tolylene diisocyanate (in a molar ratio of 20:80) and 119 grams of phenyl isocyanate was effected in the presence of 0.93 gram of a carbodiimidizing catalyst (3-methyl-1-phenyl-2-phospholene-1-oxide) at 80° C. for 1 hour, yielding a carbodiimide resin having a degree of polymerization of 5. The carbodiimide resin was thoroughly pulverized, obtaining carbodiimide powder. To 200 grams of this carbodiimide powder, 200 grams of distilled water having 1 gram of a nonylphenyl nonionic surfactant (Nonypol) dissolved therein was slowly added, obtaining a carbodiimide dispersion (resin concentration 50% by weight).

Synthesis Example 6

Aqueous carbodiimide 6 (self emulsion of aliphatic anionic carbodiimide)

Reaction of 700 grams of m-tetramethylxylylene diisocyanate was effected in the presence of 14 grams of a carbodiimidizing catalyst (3-methyl-1-phenyl-2-phospholene-1-oxide) at 180° C. for 32 hours, yielding isocyanate-terminated tetramethylxylylene carbodiimide having a degree of polymerization of 10. The carbodiimide, 224.4 grams, was reacted with 32.4 grams of sodium hydroxypropanesulfonate at 100° C. for 24 hours. To the reaction solution, 256.8 grams of distilled water was slowly added at 80° C., obtaining a carbodiimide solution (resin concentration 50% by weight).

Synthesis Example 7

Aqueous carbodiimide 7 (self solution of aliphatic anionic carbodiimide)

Reaction of 700 grams of m-tetramethylxylylene diisocyanate was effected in the presence of 14 grams of a carbodiimidizing catalyst (3-methyl-1-phenyl-2-phospholene-1-oxide) at 180° C. for 15 hours, yielding isocyanate-terminated tetramethylxylylene carbodiimide having a degree of polymerization of 5. The carbodiimide, 124.4 grams, was reacted with 32.4 grams of sodium hydroxypropanesulfonate at 100° C. for 24 hours. To the reaction solution, 156.8 grams of distilled water was slowly added at 80° C., obtaining an emulsion-like carbodiimide solution (resin concentration 50% by weight).

Synthesis Example 8

Aqueous carbodiimide 8 (self emulsion of aliphatic anionic carbodiimide)

Reaction of 700 grams of 4,4-dicyclohexylmethane diisocyanate was effected in the presence of 14 grams of a carbodiimidizing catalyst (3-methyl-1-phenyl-2-phospholene-1-oxide) at 180° C. for 32 hours, yielding isocyanate-terminated 4,4-dicyclohexylmethane carbodiimide having a degree of polymerization of 10. The carbodiimide, 244.2 grams, was reacted with 32.4 grams of sodium hydroxypropane-sulfonate at 100° C. for 24 hours. To the reaction solution, 276.6 grams of distilled water was slowly added at 80° C., obtaining an emulsion-like carbodiimide solution (resin concentration 50% by weight).

Synthesis Example 9

Aqueous carbodiimide 9 (self emulsion of aliphatic anionic carbodiimide)

Reaction of 700 grams of 4,4-dicyclohexylmethane diisocyanate was effected in the presence of 14 grams of a carbodiimidizing catalyst (3-methyl-1-phenyl-2-phospholene-1-oxide) at 180° C. for 16 hours, yielding isocyanate-terminated 4,4-dicyclohexylmethane carbodiimide having a degree of polymerization of 4. The carbodiimide, 91.6 grams, was reacted with 32.4 grams of sodium hydroxypropane-sulfonate at 100° C. for 24 hours. To the reaction solution, 124 grams of distilled water was slowly added at 80° C., obtaining an emulsion-like carbodiimide solution (resin concentration 50% by weight).

Synthesis Example 10

Aqueous carbodiimide 10 (self emulsion of aliphatic anionic carbodiimide)

Reaction of 700 grams of isophorone diisocyanate was effected in the presence of 14 grams of a carbodiimidizing catalyst (3-methyl-1-phenyl-2-phospholene-1-oxide) at 180° C. for 14 hours, yielding isocyanate-terminated isophorone carbodiimide having a degree of polymerization of 10. The carbodiimide, 200.2 grams, was reacted with 32.4 grams of sodium hydroxypropanesulfonate at 100° C. for 24 hours. To the reaction solution, 232.6 grams of distilled water was slowly added at 80° C., obtaining an emulsion-like carbodiimide solution (resin concentration 50% by weight).

Synthesis Example 11

Aqueous carbodiimide 11 (self emulsion of aliphatic anionic carbodiimide)

Reaction of 700 grams of isophorone diisocyanate was effected in the presence of 14 grams of a carbodiimidizing catalyst (3-methyl-1-phenyl-2-phospholene-1-oxide) at 180° C. for 10 hours, yielding isocyanate-terminated isophorone carbodiimide having a degree of polymerization of 5. The carbodiimide, 110.0 grams, was reacted with 32.4 grams of sodium hydroxypropanesulfonate at 100° C. for 24 hours. To the reaction solution, 142.4 grams of distilled water was slowly added at 80° C., obtaining an emulsion-like carbodiimide solution (resin concentration 50% by weight).

Synthesis Example 12

Aqueous carbodiimide 12 (self emulsion of aliphatic cationic carbodiimide)

Reaction of 700 grams of m-tetramethylxylylene diisocyanate was effected in the presence of 14 grams of a carbodiimidizing catalyst (3-methyl-1-phenyl-2-phospholene-1-oxide) at 180° C. for 18 hours, yielding isocyanate-terminated m-tetramethylxylylene carbodiimide having a degree of polymerization of 10. The carbodiimide, 112.2 grams, was reacted with 8.9 grams of 2-dimethylaminoethanol at 80° C. for 24 hours. Then 18.6 grams of methyl p-toluene-sulfonate was added to the reaction solution, which was agitated for one hour for quaternization. To the reaction solution, 139.7 grams of distilled water was slowly added, obtaining an emulsion-like carbodiimide solution (resin concentration 50% by weight).

Synthesis Example 13

Aqueous carbodiimide 13 (self solution of aliphatic cationic carbodiimide)

Reaction of 700 grams of m-tetramethylxylylene diisocyanate was effected in the presence of 14 grams of a carbodiimidizing catalyst (3-methyl-1-phenyl-2-phospholene-1-oxide) at 180° C. for 18 hours, yielding isocyanate-terminated m-tetramethylxylylene carbodiimide having a degree of polymerization of 4. The carbodiimide, 52.2 grams, was reacted with 8.9 grams of 2-dimethylaminoethanol at 80° C. for 24 hours. Then 18.6 grams of methyl p-toluene-sulfonate was added to the reaction solution, which was agitated for one hour for quaternization. To the reaction solution, 79.7 grams of distilled water was slowly added, obtaining a yellow clear carbodiimide solution (resin concentration 50% by weight).

Synthesis Example 14

Aqueous carbodiimide 14 (self emulsion of aliphatic cationic carbodiimide)

Reaction of 700 grams of 4,4-dicyclohexylmethane diisocyanate was effected in the presence of 14 grams of a carbodiimidizing catalyst (3-methyl-1-phenyl-2-phospholene-1-oxide) at 180° C. for 18 hours, yielding isocyanate-terminated 4,4-dicyclohexylmethane carbodiimide having a degree of polymerization of 10. The carbodiimide, 122.1 grams, was reacted with 8.9 grams of 2-dimethylaminoethanol at 80° C. for 24 hours. Then 18.6 grams of methyl p-toluene-sulfonate was added to the reaction solution, which was agitated for one hour for quaternization. To the reaction solution, 149.6 grams of distilled water was slowly added, obtaining an emulsion-like carbodiimide solution (resin concentration 50% by weight).

Synthesis Example 15

Aqueous carbodiimide 15 (self solution of aliphatic cationic carbodiimide)

Reaction of 700 grams of 4,4-dicyclohexylmethane diisocyanate was effected in the presence of 14 grams of a carbodiimidizing catalyst (3-methyl-1-phenyl-2-phospholene-1-oxide) at 180° C. for 24 hours, yielding isocyanate-terminated 4,4-dicyclohexylmethane carbodiimide having a degree of polymerization of 4. The carbodiimide, 56.7 grams, was reacted with 8.9 grams of 2-dimethylaminoethanol at 80° C. for 24 hours. Then 18.6 grams of methyl p-toluene-sulfonate was added to the reaction solution, which was agitated for one hour for quaternization. To the reaction solution, 84.2 grams of distilled water was slowly added, obtaining a yellow clear carbodiimide solution (resin concentration 50% by weight).

Synthesis Example 16

Aqueous carbodiimide 16 (self emulsion of aliphatic cationic carbodiimide)

Reaction of 700 grams of isophorone diisocyanate was effected in the presence of 14 grams of a carbodiimidizing catalyst (3-methyl-1-phenyl-2-phospholene-1-oxide) at 180° C. for 18 hours, yielding isocyanate-terminated isophorone carbodiimide having a degree of polymerization of 10. The carbodiimide, 100.1 grams, was reacted with 8.9 grams of 2-dimethylaminoethanol at 80° C. for 24 hours. Then 18.6 grams of methyl p-toluenesulfonate was added to the reaction solution, which was agitated for one hour for quaternization. To the reaction solution, 127.6 grams of distilled water was slowly added, obtaining an emulsion-like carbodiimide solution (resin concentration 50% by weight).

Synthesis Example 17

Aqueous carbodiimide 17 (self solution of aliphatic cationic carbodiimide)

Reaction of 700 grams of isophorone diisocyanate was effected in the presence of 14 grams of a carbodiimidizing catalyst (3-methyl-1-phenyl-2-phospholene-1-oxide) at 180° C. for 6 hours, yielding isocyanate-terminated isophorone carbodiimide having a degree of polymerization of 4. The carbodiimide, 93.4 grams, was reacted with 17.8 grams of 2-dimethylaminoethanol at 80° C. for 24 hours. Then 37.2 grams of methyl p-toluenesulfonate was added to the reaction solution, which was agitated for one hour for quaternization. To the reaction solution, 148.4 grams of distilled water was slowly added, obtaining a yellow clear carbodiimide solution (resin concentration 50% by weight).

Synthesis Example 18

Aqueous carbodiimide 18 (self emulsion of aliphatic nonionic carbodiimide)

Reaction of 700 grams of m-tetramethylxylylene diisocyanate was effected in the presence of 14 grams of a carbodiimidizing catalyst (3-methyl-1-phenyl-2-phospholene-1-oxide) at 180° C. for 32 hours, yielding isocyanate-terminated tetramethylxylylene carbodiimide having a degree of polymerization of 10. The carbodiimide, 224.4 grams, was reacted with 59.2 grams of poly (oxyethylene) monomethyl ether having a degree of polymerization of 6 at 100° C. for 48 hours. To the reaction solution, 283.6 grams of distilled water was slowly added at 50° C., obtaining an emulsion-like carbodiimide solution (resin concentration 50% by weight).

Synthesis Example 19

Aqueous carbodiimide 19 (self solution of aliphatic nonionic carbodiimide)

Reaction of 700 grams of m-tetramethylxylylene diisocyanate was effected in the presence of 14 grams of a carbodiimidizing catalyst (3-methyl-1-phenyl-2-phospholene-1-oxide) at 180° C. for 22 hours, yielding isocyanate-terminated tetramethylxylylene carbodiimide having a degree of polymerization of 5. The carbodiimide, 124.4 grams, was reacted with 59.2 grams of poly (oxyethylene) monomethyl ether having a degree of polymerization of 6 at 100° C. for 48 hours. To the reaction solution, 183.6 grams of distilled water was slowly added at 50° C., obtaining a yellow clear carbodiimide solution (resin concentration 50% by weight).

Synthesis Example 20

Aqueous carbodiimide 20 (self emulsion of aliphatic nonionic carbodiimide)

Reaction of 700 grams of 4,4-dicyclohexylmethane diisocyanate was effected in the presence of 14 grams of a carbodiimidizing catalyst (3-methyl-1-phenyl-2-phospholene-1-oxide) at 180° C. for 32 hours, yielding isocyanate-terminated 4,4-dicyclohexylmethane carbodiimide having a degree of polymerization of 10. The carbodiimide, 244.2 grams, was reacted with 59.2 grams of poly(oxyethylene) monomethyl ether having a degree of polymerization of 6 at 100° C. for 48 hours. To the reaction solution, 303.4 grams of distilled water was slowly added at 50° C., obtaining an emulsion-like carbodiimide solution (resin concentration 50% by weight).

Synthesis Example 21

Aqueous carbodiimide 21 (self solution of aliphatic nonionic carbodiimide)

Reaction of 700 grams of 4,4-dicyclohexylmethane diisocyanate was effected in the presence of 14 grams of a carbodiimidizing catalyst (3-methyl-1-phenyl-2-phospholene-1-oxide) at 180° C. for 100 hours, yielding isocyanate-terminated 4,4-dicyclohexylmethane carbodiimide having a degree of polymerization of 4. The carbodiimide, 113.4 grams, was reacted with 59.2 grams of poly(oxyethylene) monomethyl ether having a degree of polymerization of 6 at 100° C. for 48 hours. To the reaction solution, 172.6 grams of distilled water was slowly added at 50° C., obtaining a yellow clear carbodiimide solution (resin concentration 50% by weight).

Synthesis Example 22

Aqueous carbodiimide 22 (self emulsion of aliphatic nonionic carbodiimide)

Reaction of 700 grams of isophorone diisocyanate was effected in the presence of 14 grams of a carbodiimidizing catalyst (3-methyl-1-phenyl-2-phospholene-1-oxide) at 180° C. for 14 hours, yielding isocyanate-terminated isophorone carbodiimide having a degree of polymerization of 10. The carbodiimide, 200.2 grams, was reacted with 59.2 grams of poly(oxyethylene) monomethyl ether having a degree of polymerization of 6 at 100° C. for 48 hours. To the reaction solution, 259.4 grams of distilled water was slowly added at 50° C., obtaining an emulsion-like carbodiimide solution (resin concentration 50% by weight).

Synthesis Example 23

Aqueous carbodiimide 23 (self solution of aliphatic nonionic carbodiimide)

Reaction of 700 grams of isophorone diisocyanate was effected in the presence of 14 grams of a carbodiimidizing catalyst (3-methyl-1-phenyl-2-phospholene-1-oxide) at 180° C. for 8 hours, yielding isocyanate-terminated isophorone carbodiimide having a degree of polymerization of 5. The carbodiimide, 111.2 grams, was reacted with 59.2 grams of poly(oxyethylene) monomethyl ether having a degree of polymerization of 6 at 100° C. for 24 hours. To the reaction solution, 152.6 grams of distilled water was slowly added at 50° C., obtaining a yellow clear carbodiimide solution (resin concentration 50% by weight).

Synthesis Example 24

Preparation of Polyester Resin Aqueous Dispersion

A reactor equipped with a stirrer, distillation column, temperature control unit and nitrogen gas inlet tube was charged with 29.6 parts of dimethyl-5-sodiumsulfone-isophthalic acid, 155.2 parts of dimethyl terephthalate, 86.8 parts of ethylene glycol, 104 parts of neopentyl glycol, and 0.1 part of zinc acetate. Ester exchange reaction was carried out at 160 to 220° C. for 8 hours. Thereafter, 182.6 parts of isophthalic acid was added to the reactor. Reaction was effected at 190° to 240° C. for 10 hours while removing water, yielding polyester glycol having a molecular weight of 1,600 and a hydroxyl value of 70 KOH mg/g.

The same reactor as above was charged with 100 parts of the above-obtained polyester glycol and 14 parts of pyromellitic anhydride. Reaction was effected at 170° C. for 3 hours, yielding a carboxyl-containing polyester resin having an average molecular weight of 12,000 and an acid value of 63.2 KOH mg/g.

A reactor was charged with 80 parts of the carboxyl-containing polyester resin and 120 parts of methyl ethyl ketone. The contents were agitated at 70° C. for 3 hours, obtaining a uniform viscous solution. With vigorous stirring, a mixture of 5.5 parts of 28% aqueous ammonia and 294.5 parts of water was slowly added. Through azeotropic distillation, the entire amount of methyl ethyl ketone was distilled off. There was obtained a polyester resin aqueous dispersion having a resin solid content of 30%.

Synthesis Example 25

Preparation of Urethane Resin Aqueous Solution

A reactor equipped with a stirrer, distillation column, temperature control unit and nitrogen gas inlet tube was charged with 146.1 parts of polycaprolactone having a molecular weight of 2,000, 29.3 parts of dimethylpropionic acid, and 150 parts of methyl ethyl ketone. In a nitrogen atmosphere, the reactor was heated to 50° C. to dissolve the contents. Then 97.3 parts of isophorone diisocyanate was added to the reactor, which was heated to a temperature of 80° to 90° C. Reaction was effected at the temperature for 4 hours. The reaction solution was cooled and diluted with 100 parts of acetone, obtaining a prepolymer. To a solvent mixture of 3.2 parts of dibutylamine, 24.1 parts of isophorone diamine, 220 parts of acetone, and 50 parts of water kept at 30° C., 522.7 parts of the prepolymer was added dropwise for reaction, obtaining a carboxyl-containing polyurethane resin solution.

To the carboxyl-containing polyurethane resin solution, 465 parts of deionized water containing 2.7 parts of 28% aqueous ammonia was added for neutralization. The entire amounts of methyl ethyl ketone and acetone were distilled off, obtaining a carboxyl-containing polyurethane resin aqueous dispersion having a resin solid content of 26.8% and an acid value of 41 KOH mg/g.

Example 1

To 100 parts of the carboxyl-containing polyester resin synthesized in Synthesis Example 24 were added 10.0 parts of the carbodiimide solution of Synthesis Example 1 and 35 parts of titanium oxide (carbodiimide group/carboxyl group molar ratio=0.75). The mixture was applied to a steel sheet of 0.3 mm gage so as to give a dry coating thickness of 20 $\mu$m and baked at 230° C. for 30 seconds.

Examples 2–23

The procedure of Example 1 was repeated except that the carbodiimide solutions of Synthesis Examples 2 to 23 were used.

Comparative Example 1

The procedure of Example 1 was repeated except that the carbodiimide solution was omitted.

Example 24

To 100 parts of the carboxyl-containing polyurethane resin synthesized in Synthesis Example 25 were added 10.0 parts of the carbodiimide solution of Synthesis Example 1 and 35 parts of titanium oxide (carbodiimide group/carboxyl group molar ratio=1.30). The mixture was applied to a steel sheet of 0.3 mm gage so as to give a dry coating thickness of 20 $\mu$m and baked at 230° C. for 30 seconds.

Examples 25–46

The procedure of Example 24 was repeated except that the carbodiimide solutions of Synthesis Examples 2 to 23 were used.

Comparative Example 2

The procedure of Example 24 was repeated except that the carbodiimide solution was omitted.

The precoated steel sheets were examined by the following tests.

Adhesion

After a precoated steel sheet was allowed to stand at 20° C. for one hour, it was subject to the cross-cut test of JIS K-5400 by scribing the coating to define 100 sections of 1 cm×1 cm, placing adhesive tape on the scribed coating, applying an appropriate pressure to establish a firm bond, and peeling the adhesive tape off in an instant. The number (n) of coating sections left on the steel sheet was counted. The result is expressed in terms of n/100 as an index of adhesion.

Solvent Resistance

A precoated steel sheet was rubbed 100 strokes with gauze impregnated with xylene solvent. The coating surface was visually observed to find defects including peel, scratches and delustering. A defective coating was rated "X" rejected) and a sound coating was rated "O" (passed).

Acid Resistance

A precoated steel sheet was dipped in 5% by weight aqueous hydrochloric acid solution at 20° C. for 24 hours. After washing with water, the coating surface was visually observed to find defects including peel, scratches and delustering. A defective coating was rated "X" and a sound coating was rated "O."

Alkali Resistance

A precoated steel sheet was dipped in 5% by weight aqueous NaOH solution at 20° C. for 24 hours. After washing with water, the coating surface was visually observed to find defects including peel, scratches and delustering. A defective coating was rated "X" and a sound coating was rated "O."

Stain Resistance

A precoated steel sheet with lines drawn on the coating surface with red ink was allowed to stand for 24 hours. The coating surface was wiped with gauze impregnated with ethanol. The coating surface was visually observed to find the traces of lines. A traced coating was rated "X," a slightly traced coating was rated "A," and a trace-free coating was rated "O."

Water Resistance

A precoated steel sheet was dipped in a constant temperature water bath at 50° C. for 10 days. The coating surface was visually observed to find defects including delustering and blisters. A defective coating was rated "X" and a sound coating was rated "O."

Pencil Hardness

A scratch test was done at 20° C. using a pencil "Uni" commercially available from Mitsubishi Pencil K.K. The result was expressed by a pencil hardness one rank lower than the pencil hardness with which the coating was scratched.

The results are shown in Tables 1 and 2.

TABLE 1

| Example | Aqueous resin | Aqueous carbodiimide compound | Carbodiimide/ carboxyl | Adhesion | Solvent resist- ance | Acid resist- ance | Alkali resist- ance | Stain resist- ance | Water resist- ance | Pencil hardness |
|---|---|---|---|---|---|---|---|---|---|---|
| 1 | Poly- | 1 (SE1) | 0.75 | 100 | O | O | O | O | O | 2H |
| 2 | ester | 2 (SE2) | 0.68 | 100 | O | O | O | O | O | 2H |
| 3 | resin of | 3 (SE3) | 0.82 | 100 | O | O | O | O | O | 2H |
| 4 | SE 24 | 4 (SE4) | 0.72 | 100 | O | O | O | O | O | 2H |
| 5 | | 5 (SE5) | 1.03 | 100 | O | O | O | O | O | 2H |
| 6 | | 6 (SE6) | 0.58 | 100 | O | O | O | O | O | 2H |
| 7 | | 7 (SE7) | 0.47 | 100 | O | O | O | O | O | 2H |
| 8 | | 8 (SE8) | 0.53 | 100 | O | O | O | O | O | 2H |
| 9 | | 9 (SE9) | 0.40 | 99 | O | O | O | O | O | 2H |
| 10 | | 10 (SE10) | 0.63 | 100 | O | O | O | O | O | 2H |
| 11 | | 11 (SE11) | 0.52 | 99 | O | O | O | O | O | 2H |
| 12 | | 12 (SE12) | 0.53 | 100 | O | O | O | O | O | 2H |
| 13 | | 13 (SE13) | 0.37 | 98 | O | O | O | O | O | 2H |
| 14 | | 14 (SE14) | 0.49 | 99 | O | O | O | O | O | 2H |
| 15 | | 15 (SE15) | 0.35 | 97 | O | O | O | O | O | 2H |
| 16 | | 16 (SE16) | 0.58 | 100 | O | O | O | O | O | 2H |
| 17 | | 17 (SE17) | 0.40 | 99 | O | O | O | O | O | 2H |
| 18 | | 18 (SE18) | 0.52 | 100 | O | O | O | O | O | 2H |
| 19 | | 19 (SE19) | 0.40 | 99 | O | O | O | O | O | 2H |
| 20 | | 20 (SE20) | 0.50 | 100 | O | O | O | O | O | 2H |
| 21 | | 21 (SE21) | 0.34 | 100 | O | O | O | O | O | 2H |
| 22 | | 22 (SE22) | 0.58 | 100 | O | O | O | O | O | 2H |
| 23 | | 23 (SE23) | 0.43 | 99 | O | O | O | O | O | 2H |
| CE1 | | — | — | 91 | X | X | X | X | X | 2H |

TABLE 2

| Example | Aqueous resin | Aqueous carbodiimide compound | Carbodiimide/ carboxyl | Adhesion | Solvent resistance | Acid resistance | Alkali resistance | Stain resistance | Water resistance | Pencil hardness |
|---|---|---|---|---|---|---|---|---|---|---|
| 24 | Polyurethane resin of SE 25 | 1 (SE1) | 1.30 | 100 | ○ | ○ | ○ | ○ | ○ | 2H |
| 25 | | 2 (SE2) | 1.17 | 100 | ○ | ○ | ○ | ○ | ○ | 2H |
| 26 | | 3 (SE3) | 1.41 | 100 | ○ | ○ | ○ | ○ | ○ | 2H |
| 27 | | 4 (SE4) | 1.25 | 100 | ○ | ○ | ○ | ○ | ○ | 2H |
| 28 | | 5 (SE5) | 1.79 | 100 | ○ | ○ | ○ | ○ | ○ | 2H |
| 29 | | 6 (SE6) | 1.00 | 100 | ○ | ○ | ○ | ○ | ○ | 2H |
| 30 | | 7 (SE7) | 0.82 | 100 | ○ | ○ | ○ | ○ | ○ | 2H |
| 31 | | 8 (SE8) | 0.92 | 100 | ○ | ○ | ○ | ○ | ○ | 2H |
| 32 | | 9 (SE9) | 0.70 | 98 | ○ | ○ | ○ | ○ | ○ | 2H |
| 33 | | 10 (SE10) | 1.10 | 100 | ○ | ○ | ○ | ○ | ○ | 2H |
| 34 | | 11 (SE11) | 0.89 | 100 | ○ | ○ | ○ | ○ | ○ | 2H |
| 35 | | 12 (SE12) | 0.92 | 100 | ○ | ○ | ○ | ○ | ○ | 2H |
| 36 | | 13 (SE13) | 0.64 | 98 | ○ | ○ | ○ | ○ | ○ | 2H |
| 37 | | 14 (SE14) | 0.86 | 100 | ○ | ○ | ○ | ○ | ○ | 2H |
| 38 | | 15 (SE15) | 0.61 | 97 | ○ | ○ | ○ | ○ | ○ | 2H |
| 39 | | 16 (SE16) | 1.00 | 100 | ○ | ○ | ○ | ○ | ○ | 2H |
| 40 | | 17 (SE17) | 0.69 | 98 | ○ | ○ | ○ | ○ | ○ | 2H |
| 41 | | 18 (SE18) | 0.89 | 100 | ○ | ○ | ○ | ○ | ○ | 2H |
| 42 | | 19 (SE19) | 0.69 | 98 | ○ | ○ | ○ | ○ | ○ | 2H |
| 43 | | 20 (SE20) | 0.84 | 100 | ○ | ○ | ○ | ○ | ○ | 2H |
| 44 | | 21 (SE21) | 0.59 | 100 | ○ | ○ | ○ | ○ | ○ | 2H |
| 45 | | 22 (SE22) | 1.00 | 100 | ○ | ○ | ○ | ○ | ○ | 2H |
| 46 | | 23 (SE23) | 0.74 | 99 | ○ | ○ | ○ | ○ | ○ | 2H |
| CE2 | | — | — | 89 | X | X | X | X | X | 2H |

Note that SE is an abbreviation of Synthesis Example and CE is an abbreviation of Comparative Example.

Examples 47–50

To 100 parts of the carboxyl-containing polyester resin synthesized in Synthesis Example 24 were added a varying amount of the carbodiimide solution of Synthesis Example 20 and 35 parts of titanium oxide. The mixture was applied to a steel sheet of 0.3 mm gage so as to give a dry coating thickness of 20 $\mu$m and baked at 230° C. for 30 seconds.

The precoated steel sheets were examined by the same tests as above. The results are shown in Table 3.

TABLE 3

| Example | Parts of carbodiimide | Carbodiimide/ carboxyl | Adhesion | Solvent resistance | Acid resistance | Alkali resistance | Stain resistance | Water resistance | Pencil hardness |
|---|---|---|---|---|---|---|---|---|---|
| 47 | 5 | 0.25 | 96 | ○ | ○ | ○ | ○ | Δ | 2H |
| 48 | 100 | 5.0 | 100 | ○ | ○ | ○ | ○ | ○ | 2H |
| 49 | 200 | 10.0 | 99 | ○ | ○ | ○ | ○ | ○ | 2H |
| 50 | 400 | 20.0 | 96 | ○ | ○ | ○ | ○ | ○ | H |

Examples 51–54

A proper amount of the carbodiimide solution of Synthesis Example 21 was added to 100 parts of an acrylic resin having a varying acid value (Johncryl® by Johnson Polymer K.K.) so as to provide a carbodiimide group/carboxyl group molar ratio=1.0. Titanium oxide was added in the same parts as the solids of the acrylic resin. The mixture was applied to a steel sheet of 0.3 mm gage so as to give a dry coating thickness of 20 $\mu$m and baked at 230° C. for 30 seconds.

The precoated steel sheets were examined by the same tests as above. The results are shown in Table 4.

TABLE 4

| Example | Johncryl Designation | Johncryl Acid value | Johncryl Parts | Parts of carbodiimide | Parts of TiO$_2$ | Adhesion | Solvent resistance | Acid resistance | Alkali resistance | Stain resistance | Water resistance | Pencil hardness |
|---------|------|-----|-----|-------|------|-----|---|---|---|---|---|----|
| 51 | J-790 | 30 | 100 | 25.3 | 54.8 | 96 | ○ | ○ | ○ | ○ | Δ | 2H |
| 52 | J-450 | 100 | 100 | 75.3 | 49.0 | 100 | ○ | ○ | ○ | ○ | ○ | 2H |
| 53 | J-683 | 150 | 100 | 268.8 | 117 | 99 | ○ | ○ | ○ | ○ | ○ | 2H |
| 54 | J-550 | 200 | 100 | 358.4 | 117 | 99 | ○ | ○ | ○ | ○ | ○ | H |

As is evident from Tables 1 to 4, the coatings on sheet metal within the scope of the invention are satisfactory in all the tests of adhesion, solvent resistance, acid resistance, alkali resistance, stain resistance, and water resistance.

Although some preferred embodiments have been described, many modifications and variations may be made thereto in the light of the above teachings. It is therefore to be understood that within the scope of the appended claims, the invention may be practiced otherwise than as specifically described.

We claim:

1. A precoated aluminum or stainless steel that is prepared by
   coating said aluminum or stainless steel with an aqueous coating composition for the manufacture of precoated metal, comprising:
   an aqueous resin binder having a carboxyl group in a molecule and neutralizable with a basic material, wherein said aqueous resin is selected from the group consisting of an acrylic copolymer resin, polyester resin, and polyurethane resin; and
   a polycarbodiimide compound obtained by condensation reaction concomitant with decarboxylation of tetramethylxylylene diisocyanate; and curing said precoated aluminum or stainless steel.

2. The precoated aluminum or stainless steel according to claim 1, wherein said aqueous resin has an acid value based on carboxyl group in the range of 20 to 200 KOH mg/g and said carbodiimide compound is blended in such an amount as to give a carbodiimide group to carboxyl group molar ratio between 0.2/1 and 20/1.

3. The precoated aluminum or stainless steel according to claim 1, wherein said carbodiimide compound is blended in the form of an emulsion obtained by emulsifying the compound with the aid of an emulsifier.

4. The precoated aluminum or stainless steel according to claim 1, wherein said carbodiimide compound has been converted into a self-emulsifying or self-solubilizing form by adding a hydrophilic segment to its molecular structure.

* * * * *